Patented Feb. 10, 1942

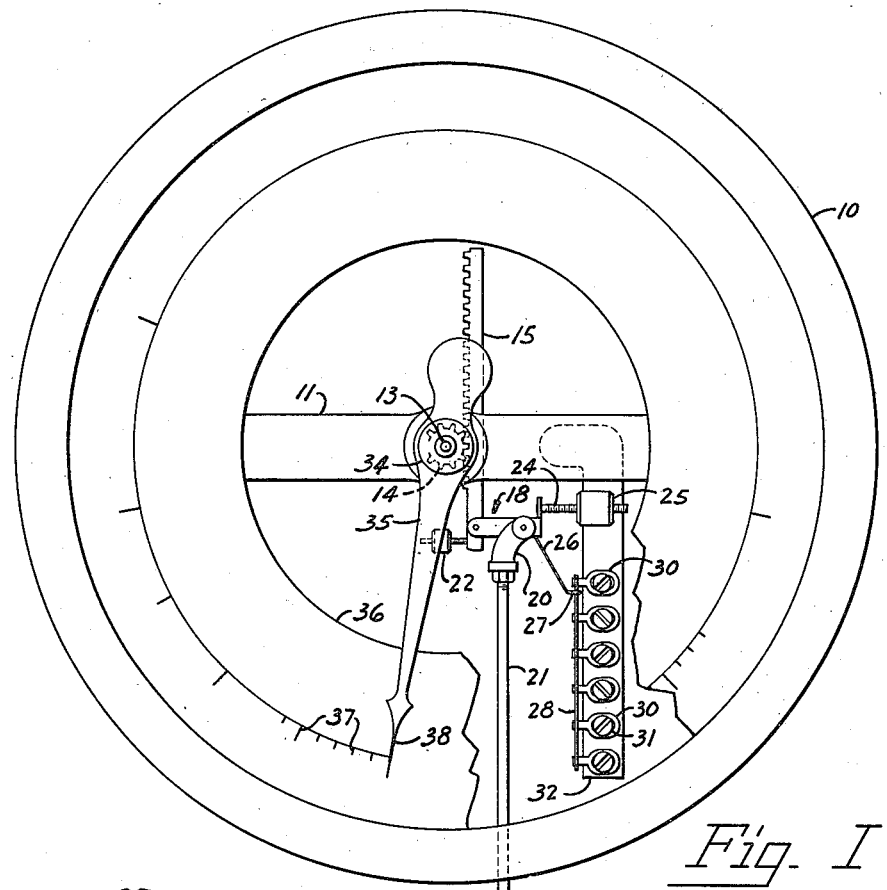
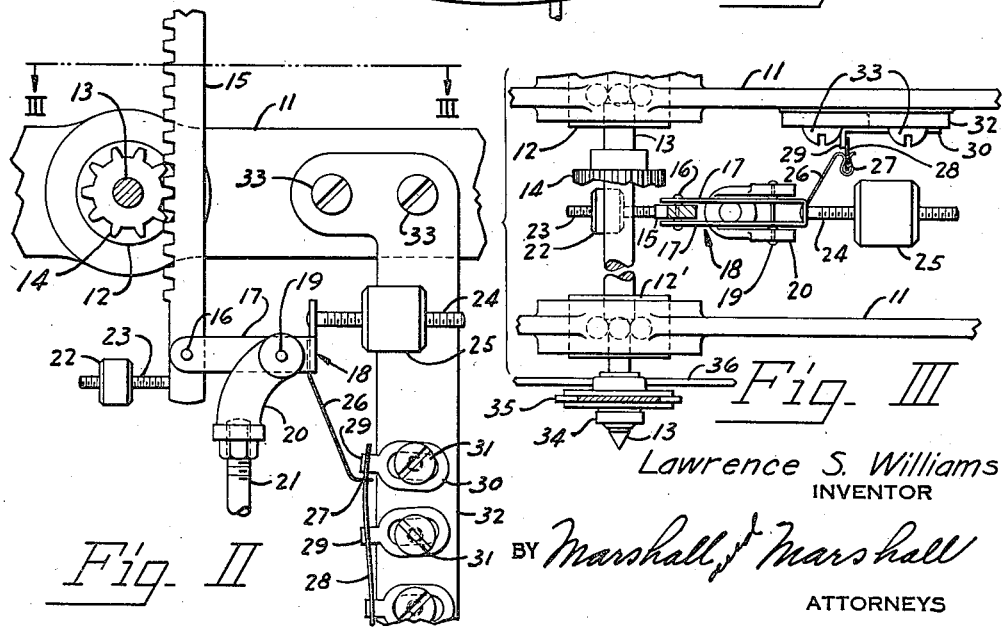

2,272,988

UNITED STATES PATENT OFFICE 2,272,988

MEASURING INSTRUMENT

Lawrence S. Williams, Toledo, Ohio, assignor to Toledo Scale Company, Toledo, Ohio, a corporation of New Jersey Application October 31, 1939, Serial No. 302,259

6 Claims. (Cl. 73—151)

This invention relates to measuring instruments, and concerns particularly measuring instruments having a relatively movable graduated chart and indicator.

The principal object of the invention is the provision of improved means, in an indicating measuring device, for imparting corrective variations to the movement of the indicator.

Another object is the provision of a deformable, substantially straight calibrating strip and means guided by said strip for governing the relative movement of a chart and indicator; and Still another object is the provision of a relatively movable chart and indicator in which rectilinearly movable means are provided for actuating the movable indicator and in which a deformable member is positioned substantially parallel to the path of movement of the rectilinearly movable means for influencing the position of the indicator.

These, and other objects and advantages will be apparent from the following description in which reference is had to the accompanying drawing, illustrating a preferred embodiment of the invention and in which similar reference numerals refer to similar parts throughout the several views.

In the drawing—

Fig. I is a front elevational view of an indicating mechanism for measuring devices, parts being broken away.

Fig. II is an enlarged, fragmentary view of the indicator driving and indicator position controlling means; and Fig. III is a sectional plan view sectioned substantially along the line III—III of Fig. II.

Referring to the drawing in detail:

The indicating means shown in Fig. I comprise a casing 10 having a hollow interior which is spanned by horizontally disposed spaced bars 11. Ball bearings 12 and 12', suitably positioned in apertures in these bars, receive the opposite ends of an indicator shaft 13 upon which is circumjacently mounted a pinion 14. Teeth of this pinion engage the teeth of a rack 15 whose lower end is pivoted on a pintle 16 extending between spaced parallelly extending arms 17 of a substantially U-shaped supporting member 18. The supporting member 18 is pivoted upon a pintle 19 extending between the arms of a fulcrum fork 20 adjustably threaded on the end of a rod-like member 21, operatively connected to force counterbalancing mechanism (not shown) and given reciprocating rectilinear motion by such mechanism.

For the purpose of maintaining the teeth of the rack 15 in engagement with the teeth of the pinion 14, a small balance weight 22 is threaded upon a rod 23 which is studded into the rack body and extends laterally therefrom; and for the purpose of statically balancing the assembly comprising the rack 15 and the U-shaped supporting member 18 about the fulcrum on the pintle 19, the bight portion of the U-shaped member 18 is provided with an extension in which a rod 24 is riveted and on which is adjustably threaded a weight 25. Also secured to the bight portion of the member 18 is a downwardly and laterally extending relatively stiff arm 26, preferably made from music wire. This arm terminates in an open-ended loop 27 (Fig. III) which slidingly engages a deformable strip of flexible metallic steel ribbon 28 which is riveted or preferably spot welded to bent-up arms 29 of a plurality of angle clips 30 which, by means of flat-headed screws 31 passing through elongated slots, are adjustably clamped to a plate 32 which depends from one of the horizontally disposed bars 11 to which it is fastened by screws 33.

To that portion of the indicator shaft 13 which extends outwardly beyond the ball bearing 12' is fastened, by means of a hub 34, an indicator 35 and stationed immediately in back of this hand is a chart 36 bearing a series of equally spaced graduations 37 to cooperate with an index 38 of the indicator 35 to indicate the magnitude of a condition under measurement.

The herein described indicating means may be used in connection with many types of automatically indicating measuring devices and for that reason no particular force counterbalancing or measuring mechanism is shown. It is necessary, however, that such force measuring mechanism includes a member which, when the device is in operation, be deflected substantially rectilinearly and that this deflection be a function of the force being measured. In this embodiment of the invention it is assumed that the member 21 is operatively connected to such a part of the force measuring mechanism and, therefore, the horizontal plane in which the pintle 19, on which the rack 15 and its supporting member 18 is positioned, is proportional to the magnitude of the condition under measurement. When this reciprocating rectilinear motion of the member 21 is translated into rotation of the indicator 35, in the usual manner by the cooperation of the rack 15 and pinion 14, the index 38 of the indicator 35 points to that indicium in the series 37 on the chart 36 which is indicative of the value of the force being measured.

In some force measuring instruments the deflections of the mechanism are not uniform for equal increments of force applied. When this is the case the graduations on the chart are unequally spaced, or other means must be provided in the mechanism for making corrective compensations. Such means usually, however, add considerably to the cost of the device.

In this embodiment of the present invention, when a force of known magnitude is applied to the device the member 21 which is operatively connected to measuring mechanism moves downwardly, the supporting member 18 and rack 15 partake of this movement, and the indicator 35, through the pinion 14, is rotated. If its index 38 does not point to that indicium in the series 37, indicative of the value of the force applied, the operator may calibrate the device by loosening the screw 31 retaining that angle clip 30 which is then positioned nearest the open ended loop 27 of the arm 26 attached to the rack support 18, and by moving this clip either to the right or to the left, deform the strip 28 of flexible material (see Fig. II) until the arm 26 which is guided by this strip has caused the rack support 18 to pivot on the pintle 19 to such extent that the rack 15 is raised or lowered and through the pinion 14 has imparted such corrective additional movement to the indicator 35 so that its index now is in proper registration with the indicium. The adjusted clip 30 is then locked in this position.

Since the deformable strip 28 is co-extensive with the length of rectilinear movement of the member 21 and parallel thereto, others of the plurality of clips 30 may be similarly adjusted until the flexible strip 28 has assumed such shape so as to impart corrective variation to the movement of the indicator 35 over the entire chart capacity.

The embodiment of the invention herein shown and described is to be regarded as illustrative only, and it is to be understood that the invention is susceptible to variation, modification and change within the spirit and scope of the subjoined claims.

Having described the invention, I claim:

1. In a measuring device, in combination, a housing, indicating means mounted within said housing, said indicating means comprising a rectilinearly movable member movable in response to a change in magnitude of a condition under measurement, a rack, a rack supporting member, means for pivotally supporting said rack upon said rack supporting member, said rack supporting member being pivoted upon said rectilinearly movable member and movable therewith, means for statically balancing said rack and said rack supporting member about its pivot on said rectilinearly movable member, an indicator, a pinion operatively connected to said indicator, means for holding said rack in constant engagement with said pinion, a deformable member positioned substantially parallel to the path of movement of said rack supporting member, means for deforming portions of said deformable member so that such portions assume a nonparallel position with respect to such rectilinear movement of said rack supporting member and means fixedly engaging said rack supporting member and movable along said deformable member whereby such deformed portions of said deformable member influence the movement of said rack.

2. In a measuring device, in combination, a housing, indicating means mounted within said housing, said indicating means comprising a rectilinearly movable member movable in response to change in magnitude of a condition under measurement, a rack, a rack supporting member pivoted upon said rectilinearly movable member and movable therewith, and pivotally supporting said rack, an indicator, a pinion operatively connected to said indicator and in engagement with said rack, a deformable member positioned substantially parallel to the path of movement of said rack supporting member, means for deforming portions of said deformable member so that such portions assume a nonparallel position with respect to such rectilinear movement of said rack supporting member, an arm extending from said rack supporting member and adapted to slidingly engage said deformable member throughout the entire movement of said rectilinearly movable member whereby such deformed portions of said deformable member cause said rack supporting member to rock about its fulcrum on said rectilinear movable member and vary the movement of said rack with respect to the movement of said rectilinearly movable member.

3. In a measuring device, in combination, a housing, indicating means mounted within said housing, said indicating means comprising a rectilinearly movable member movable in response to change in magnitude of a condition under measurement, a rack, a rack supporting member pivoted upon said rectilinearly movable member and movable therewith, an indicator, a pinion operatively connected to said indicator and in engagement with said rack, a deformable member positioned substantially parallelly to the path of movement of said rack supporting member, means for deforming portions of said deformable member so that such portions assume a nonparallel position with respect to such rectilinear movement of said rack supporting member and means fixedly engaging said rack supporting member and movable along said deformable member whereby such deformed portions of said deformable member influence the movement of said rack.

4. In a measuring device, in combination, a rotatable indicator, a member substantially rectilinearly movable in response to change in magnitude of a condition under measurement for imparting rotative movement of said indicator, a chart, said rectilinearly movable member causing said indicator to be positioned to approximately indicate a value on said chart and means for causing corrective variations in the position of said indicator, said means for causing such corrective variations in the position of said indicator comprising an elongated deformable member mounted substantially in parallelism to the substantially rectilinear path of movement of said movable member, an arm cooperating with said indicator and having relative movement along said deformable member during movement of said movable member and acting in response to deformations of said deformable member to cause corrective positioning of said indicator.

5. In a measuring device of the class described, in combination, a member substantially rectilinearly movable in response to change in magnitude of a condition under measurement, a graduated chart, an indicator movable relatively thereto for cooperation therewith, a pinion operatively connected to said indicator, a rack operatively connected to said movable member and in engagement with said pinion, a flexible strip mounted substantially in parallelism to the path of movement of said movable member, an arm fixedly attached to said movable member and slidingly engaging said flexible strip and means for flexing portions of said flexible strip so that such portions assume a nonparallel position with respect to the path of movement of said movable member.

6. In a measuring device of the class described, in combination, a member movable in response to change in magnitude of a condition under measurement, a graduated chart, an indicator movable relatively thereto, means for actuating said indicator, said means being actuated by said movable member, a strip of flexible metallic ribbon mounted along a substantially straight line substantially in parallelism to the path of movement of said movable member, an arm cooperating with said indicator actuating means and slidably engaging said strip of flexible metallic ribbon, and means for flexing portions of said strip of flexible metallic ribbon independently of other portions thereof.

LAWRENCE S. WILLIAMS.